US008571865B1

(12) United States Patent
Hewinson (10) Patent No.: US 8,571,865 B1
(45) Date of Patent: Oct. 29, 2013

(54) INFERENCE-AIDED SPEAKER RECOGNITION

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/572,364

(22) Filed: Aug. 10, 2012

(51) Int. Cl.
*G10L 15/00* (2013.01)

(52) U.S. Cl.
USPC ........... 704/236; 704/246; 704/247; 704/248; 704/249; 704/250; 704/270; 704/272; 704/273; 704/275

(58) Field of Classification Search
USPC .......... 704/236, 246–250, 270, 272, 273, 275
See application file for complete search history.

(56) References Cited

U.S. PATENT DOCUMENTS

| | | | |
|---|---|---|---|
| 5,369,685 A | 11/1994 | Kero | |
| 5,483,586 A | 1/1996 | Sussman | |
| 5,752,232 A | 5/1998 | Basore et al. | |
| 5,991,364 A | 11/1999 | McAllister et al. | |
| 6,044,399 A | 3/2000 | Elledge | |
| 6,463,533 B1 | 10/2002 | Calamera et al. | |
| 6,650,735 B2 | 11/2003 | Burton et al. | |
| 6,768,792 B2 | 7/2004 | Brown et al. | |
| 6,999,930 B1 * | 2/2006 | Roberts et al. | 704/270.1 |
| 7,120,927 B1 | 10/2006 | Beyda et al. | |
| 7,360,248 B1 * | 4/2008 | Kanevsky et al. | 726/21 |
| 7,487,089 B2 * | 2/2009 | Mozer | 704/246 |
| 7,526,073 B2 | 4/2009 | Romeo | |
| 7,536,304 B2 * | 5/2009 | Di Mambro et al. | 704/273 |
| 7,571,100 B2 * | 8/2009 | Lenir et al. | 704/270.1 |
| 7,747,446 B2 * | 6/2010 | Blass et al. | 704/275 |
| 7,890,957 B2 | 2/2011 | Campbell | |
| 7,966,171 B2 * | 6/2011 | Gilbert et al. | 704/8 |
| 7,970,384 B1 | 6/2011 | Lambert et al. | |
| 8,090,944 B2 * | 1/2012 | Lee | 713/168 |
| 8,095,672 B1 | 1/2012 | Newstadt et al. | |
| 8,140,340 B2 * | 3/2012 | Bhogal et al. | 704/273 |
| 8,185,646 B2 * | 5/2012 | Headley | 709/229 |
| 8,218,744 B2 | 7/2012 | Belz et al. | |
| 8,219,404 B2 * | 7/2012 | Weinberg et al. | 704/273 |
| 8,225,103 B2 * | 7/2012 | Chiou et al. | 713/186 |
| 8,265,928 B2 * | 9/2012 | Kristjansson et al. | 704/227 |
| 8,280,740 B2 * | 10/2012 | Di Mambro et al. | 704/273 |
| 8,302,152 B1 * | 10/2012 | Hewinson | 726/1 |

(Continued)

OTHER PUBLICATIONS

Maes, Patti, "Agents that Reduce Work and Information Overlad", file:///C|/Misdocumentos/alberto/itesm/Sistemas/material_curso/maes94/maes94.html, Oct. 10, 2000, 17 pages.

(Continued)

*Primary Examiner* — Pierre-Louis Desir
*Assistant Examiner* — Fariba Sirjani
(74) *Attorney, Agent, or Firm* — Fish & Richardson P.C.

(57) ABSTRACT

Systems, methods performed by data processing apparatus and computer storage media encoded with computer programs for receiving information relating to (i) a communication device that has received an utterance and (ii) a voice associated with the received utterance, comparing the received voice information with voice signatures in a comparison group, the comparison group including one or more individuals identified from one or more connections arising from the received information relating to the communication device, attempting to identify the voice associated with the utterance as matching one of the individuals in the comparison group, and based on a result of the attempt to identify, selectively providing the communication device with access to one or more resources associated with the matched individual.

29 Claims, 5 Drawing Sheets

(56) References Cited

U.S. PATENT DOCUMENTS

| | | | |
|---|---|---|---|
| 8,358,759 B2 * | 1/2013 | Kumar | 379/145 |
| 8,478,195 B1 * | 7/2013 | Hewinson | 455/41.1 |
| 8,478,196 B1 * | 7/2013 | Hewinson | 455/41.1 |
| 2002/0147914 A1 | 10/2002 | Arnold | |
| 2002/0152272 A1 | 10/2002 | Yairi | |
| 2005/0164651 A1 | 7/2005 | Ollis et al. | |
| 2005/0171774 A1 * | 8/2005 | Applebaum et al. | 704/250 |
| 2005/0210268 A1 * | 9/2005 | Duke et al. | 713/186 |
| 2005/0232470 A1 * | 10/2005 | Chaudhari et al. | 382/115 |
| 2006/0035632 A1 | 2/2006 | Sorvari et al. | |
| 2006/0235684 A1 | 10/2006 | Chang | |
| 2006/0277043 A1 * | 12/2006 | Tomes et al. | 704/247 |
| 2006/0293891 A1 * | 12/2006 | Pathuel | 704/246 |
| 2007/0060114 A1 | 3/2007 | Ramer et al. | |
| 2007/0066288 A1 | 3/2007 | Soelberg et al. | |
| 2007/0100929 A1 | 5/2007 | DeRobertis et al. | |
| 2007/0169202 A1 | 7/2007 | Goldberg et al. | |
| 2008/0037720 A1 | 2/2008 | Thomson et al. | |
| 2008/0082332 A1 * | 4/2008 | Mallett et al. | 704/250 |
| 2008/0091425 A1 * | 4/2008 | Kane | 704/246 |
| 2009/0177461 A1 * | 7/2009 | Ehsani et al. | 704/2 |
| 2010/0030738 A1 | 2/2010 | Geer | |
| 2010/0088753 A1 | 4/2010 | Ayres et al. | |
| 2010/0153116 A1 * | 6/2010 | Szalai et al. | 704/260 |
| 2010/0161338 A1 * | 6/2010 | Tofighbakhsh | 704/273 |
| 2010/0316198 A1 * | 12/2010 | Balasaygun et al. | 379/88.02 |
| 2011/0022388 A1 * | 1/2011 | Wu et al. | 704/246 |
| 2011/0047076 A1 | 2/2011 | Carlson et al. | |
| 2011/0047245 A1 | 2/2011 | Abramson et al. | |
| 2011/0082874 A1 | 4/2011 | Gainsboro et al. | |
| 2011/0177829 A1 | 7/2011 | Platt et al. | |
| 2011/0194682 A1 | 8/2011 | Hans et al. | |
| 2011/0221671 A1 * | 9/2011 | King et al. | 345/156 |
| 2011/0231310 A1 * | 9/2011 | Roberts et al. | 705/40 |
| 2011/0258686 A1 | 10/2011 | Raj et al. | |
| 2011/0288866 A1 * | 11/2011 | Rasmussen | 704/246 |
| 2011/0302128 A1 | 12/2011 | Hayashi et al. | |
| 2012/0022874 A1 | 1/2012 | Lloyd et al. | |
| 2012/0065973 A1 * | 3/2012 | Cho et al. | 704/246 |
| 2012/0078638 A1 * | 3/2012 | Novack et al. | 704/273 |
| 2012/0084078 A1 * | 4/2012 | Moganti et al. | 704/201 |
| 2012/0084563 A1 * | 4/2012 | Singhal | 713/168 |
| 2012/0134478 A1 * | 5/2012 | Broman et al. | 379/88.02 |
| 2012/0173239 A1 * | 7/2012 | Sanchez Asenjo et al. | 704/246 |
| 2012/0201362 A1 * | 8/2012 | Crossan et al. | 379/88.01 |
| 2012/0232900 A1 * | 9/2012 | Brummer et al. | 704/239 |
| 2012/0239407 A1 * | 9/2012 | Lynch et al. | 704/500 |
| 2012/0253790 A1 * | 10/2012 | Heck et al. | 704/9 |
| 2012/0253811 A1 * | 10/2012 | Breslin et al. | 704/249 |
| 2012/0260188 A1 | 10/2012 | Park et al. | |
| 2012/0265703 A1 * | 10/2012 | Basra et al. | 705/319 |
| 2012/0296643 A1 * | 11/2012 | Kristjansson et al. | 704/226 |
| 2012/0310980 A1 | 12/2012 | Hepper | |
| 2013/0006634 A1 * | 1/2013 | Grokop et al. | 704/245 |
| 2013/0030802 A1 * | 1/2013 | Jia et al. | 704/231 |
| 2013/0036458 A1 * | 2/2013 | Liberman et al. | 726/6 |
| 2013/0072295 A1 * | 3/2013 | Alderucci et al. | 463/29 |
| 2013/0195285 A1 * | 8/2013 | De La Fuente et al. | 381/92 |

OTHER PUBLICATIONS

Nardi et al., "Collaborative, Programmable Intelligent Agents", Communications of the ACM, vol. 41, No. 3, Mar. 1998, 9 pages.

Aswani et al; Mining Information for Instance Unification; ISWC 2006, LNCS 4273; 2006; pp. 329-342; Springer-Verlag Berlin Heidelberg.

Adaptive Systems: from intelligent tutoring to autonomous agents; Benyon et al; http://citeseerx.ist.psu.edu/viewdoc/summary?doi=10.1.1.63.3407; downloaded Aug. 1, 2012; 1993; 52 pages.

An Open Agent Architecture; Cohen et al; http://citeserx.ist.psu.edu/viewdoc/similar?doi=10.1.1.30.480&type=ab; downloaded Aug. 1, 2012; 1994; 8 pages.

Non-final Office Action; Hicks, Michael J.; Publication Mailed Oct. 26, 2012; U.S. Appl. No. 13/561,621; 12 pages.

Non-final Office Action; Neway, Samuel G.; Publication Mailed Dec. 28, 2012; U.S. Appl. No. 13/572,369; 9 pages.

Pantel, Patrick ; Alias Detection in Malicious Environments; Proceedings of AAAI fall symposium on capturing and using patterns for evidence detection; 2006; pp. 14-20; American Association for Artificial Intelligence.

Non-final Office Action; Tran, Philip B.; Publication Mailed Dec. 6, 2012; U.S. Appl. No. 13/572,208; 12 pages.

Notice of Allowance issued in U.S. Appl. No. 13/572,369 on Jul. 1, 2013, 17 pages.

Notice of Allowance issued in U.S. Appl. No. 13/572,208 on Jul. 12, 2013, 11 pages.

Notice of Allowance issued in U.S. Appl. No. 13/572,369 on Feb. 6, 2013, 7 pages.

Office Action issued in U.S. Appl. No. 13/561,621 on Feb. 20, 2013, 12 pages.

Notice of Allowance issued in U.S. Appl. No. 13/572,369 on Mar. 22, 2013, 15 pages.

Notice of Allowance issued in U.S. Appl. No. 13/572,208 on Mar. 29, 2013, 18 pages.

* cited by examiner

INFERENCE-AIDED SPEAKER RECOGNITION

FIELD

This specification generally relates to systems and techniques for recognizing the identity of a speaker based on the speaker's voice, otherwise referred to as voice recognition or speaker recognition.

BACKGROUND

Increasingly, computer-implemented user resources such as searching, voice dialing, access to electronic contact lists, maps, calendars, task lists and the like, are cloud-based. To access such cloud-based services, a user typically provides input to his or her communication device (e.g., smart phone or tablet computer), which communicates the input to a remote server, which in turn processes the input and performs a function and/or returns a result to the communication device, which is then communicated to the user. For example, if the user's electronic contact list is stored in the cloud rather than locally on his communication device, the user could initiate a call with a friend by speaking the command "Call Joe Smith" into his communication device, which would parse and analyze the received command and communicate it as appropriate to a remote server, which would then extract Joe Smith's telephone number from the user's cloud-based contact list and use it to initiate a telephone call from the user's communication device to the communication device associated with Joe Smith's telephone number.

SUMMARY

In general, one aspect of the subject matter described in this specification may be embodied in systems, methods performed by data processing apparatus and computer storage media encoded with computer programs that include the actions of receiving information relating to (i) a communication device that has received an utterance and (ii) a voice associated with the received utterance, comparing the received voice information with voice signatures in a comparison group, the comparison group including one or more individuals identified from one or more connections arising from the received information relating to the communication device, attempting to identify the voice associated with the utterance as matching one of the individuals in the comparison group, and based on a result of the attempt to identify, selectively providing the communication device with access to one or more resources associated with the matched individual.

Information relating to the communication device may include either or both of an identity of an owner of the communication device (e.g., determined based on one or more of (a) a unique identifier associated with the communication device and (b) a persistent login state of the communication device) and/or a location of the communication device (e.g., determined based on one or more of a cell region, a GPS location, and an Internet Protocol (IP) address).

The actions may further include analyzing a body of information associated with the communication device's owner to identify individuals having a social connection with the communication device's owner, and adding the identified individuals to the comparison group. Alternatively, or in addition, the actions may include analyzing information associated with the communication device's location to identify individuals having an associated threshold proximity to the communication device, and adding the identified individuals to the comparison group. Subsequent to identifying and prior to providing, the actions may further include confirming the matched individual's identity using solicited input from a user of the communication device.

Providing the communication device with access to one or more resources may include providing the communication device with access to at least one of personal information and personalized services, either locally on the communication device itself or cloud-based or a combination of both. In an implementation, the communication device is provided access to one or more resources associated with the matched individual only if the voice associated with the utterance is successfully matched to one of the individuals in the comparison group.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
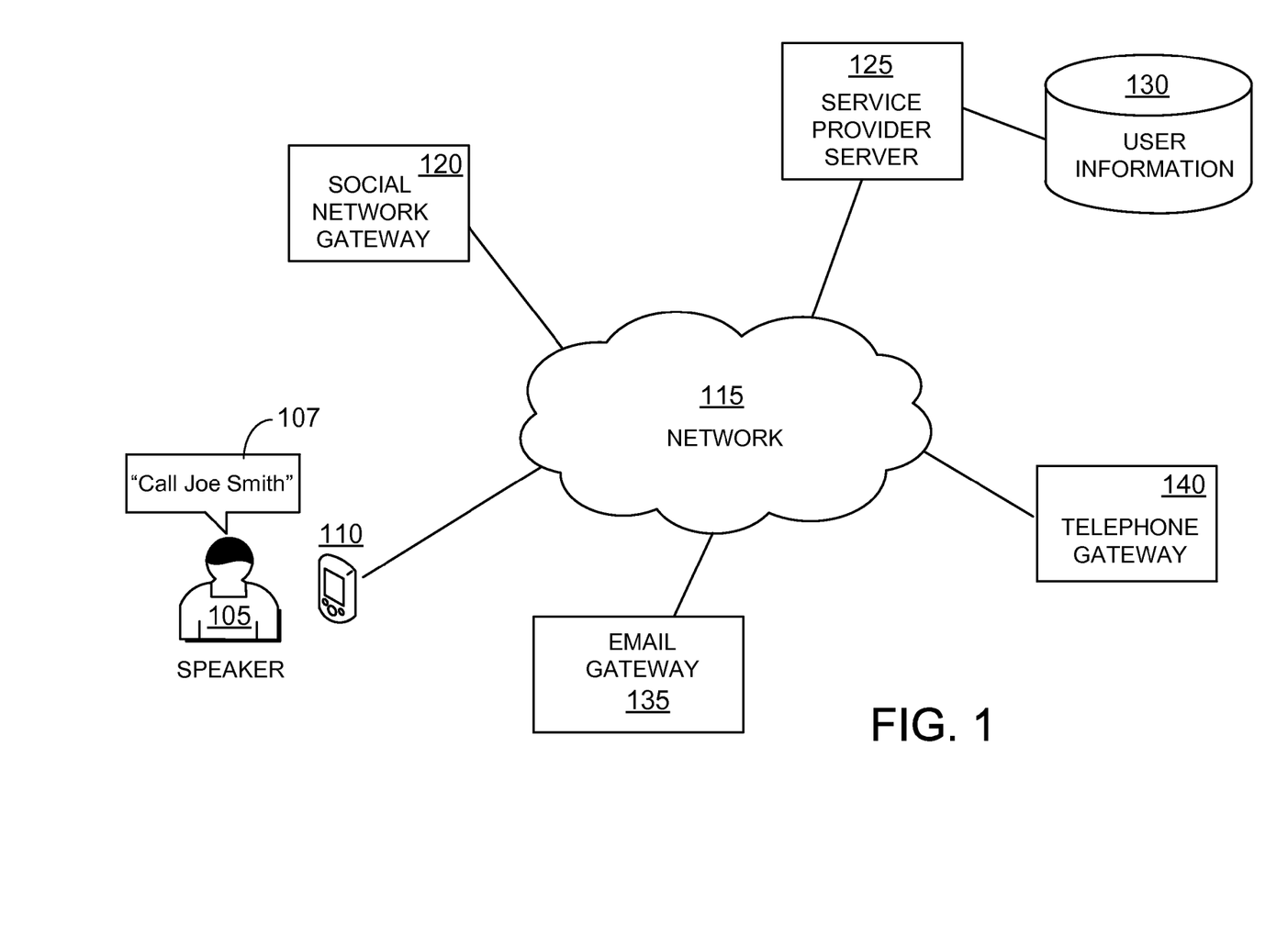
FIG. 1 is an example network diagram.

FIG. 1 is an example network diagram in which a speaker 105 can provide voice input to or otherwise interact with a communication device 110 (e.g., smartphone, tablet computer, etc.) to access, via network 115, cloud-based, personalized services or other resources that are provided or facilitated by, e.g., a server 125. Examples of such services include searching, voice dialing, access to electronic contact lists, maps, calendars, task lists and the like. As shown, the server 125 maintains a repository 130 of user information including, e.g., a description of each user's specified preferences, demographic information, location information, electronic contact lists and the like, which the server 125 can use to provide personalized services to recognized individuals. For example, assuming the server 125 knows the identity of speaker 105, the server 125 upon receiving an appropriate command (in this example, contained in an utterance 107 spoken into communication device 110) can access the speaker's personal information in repository 130 and use that personal information to initiate a communication instance between communication device 110 and an intended recipient via one or more of email gateway 135, telephone gateway 140, and social network gateway 120.

But in order for the server 125 to be able to provide such personalized services to the speaker 105, the server 125 typically must know the speaker's identity in order to determine which user's personal information to access. For example, when a speaker 105 issues an utterance 107 (e.g., "call Joe Smith"), which is to be parsed and used to look-up and extract a telephone number or other communication identifier of an intended communication recipient (in this example, Joe Smith), the server 125 must know the identity of the user that spoke the utterance 107, among other reasons, in order to know which user's contact list to use. In many cases, the server 125 knows, or can correctly assume, the identity of the speaker 105 as a result of either or both of (i) a persistent data connection through which the speaker is logged in using appropriate credentials and (ii) a unique number or other identifier associated with the communication device 110 from which the utterance 107 was received—e.g., an IMEI (International Mobile Equipment Identity) number, MAC (Media Access Control) address, ESN (electronic serial number) or the like. Various scenarios exist, however, where the server 125 does not know, or cannot safely assume, the speaker's identity upon receiving an utterance 107 that required, or would benefit from, knowledge of the identity of the speaker 105 that made it.

If, for example, the speaker was using a communication device 110 owned or controlled by another entity (e.g., a friend), then the server 125 would not necessarily know the speaker's identity, and in fact, might mistakenly misidentify the speaker 105 as being the speaker's friend and, consequently, incorrectly provide access to the friend's personal information rather than to the speaker's personal information. More specifically, if the speaker 105 was in fact User A but the communication device 110 was owned by, or otherwise associated with another, say User X, then the server 125—upon receiving communication device 110's unique identifier and matching it to User X—might incorrectly assume that the utterance 107 was made by User X and, consequently, access the incorrect body of personal user information.

To disambiguate or otherwise correctly identify the speaker 105, the server 125 can use speaker recognition—that is, compare the speaker's voice (as embodied in the received utterance 107) against a repository of previously developed voice signatures, each of which uniquely identifies a specific individual. A service provider may, for example, have on record a voice signature for each registered user, or at least those who opted-in and chose to participate in the service provider's use of voice recognition technologies. Whenever an utterance 107 is received and the server 125 has doubt about the identity of the utterance's speaker 105, the server could compare the received utterance against its repository of voice signatures to properly identify the speaker.

However, for service providers that have a great deal of registered users, comparing a received utterance against a large repository of voice signatures may tend to be prohibitively time- and/or computationally intensive. In that event, the server 125 can instead use inference-aided speaker recognition—that is, speaker recognition that need not compare the speaker's voice to the entire universe of potential speakers but rather only against a limited group of potential speakers, the set of whom are identified using inferences, or connections, arising from information relating to communication device 110 from which the utterance 107 was received. Essentially any appropriate inference or connection that limits the universe of potential speakers could be used. Examples of connections that could be used in this regard include an associated location of the communication device 110 and/or social connections of the owner of the communication device 110.

Figure 2:
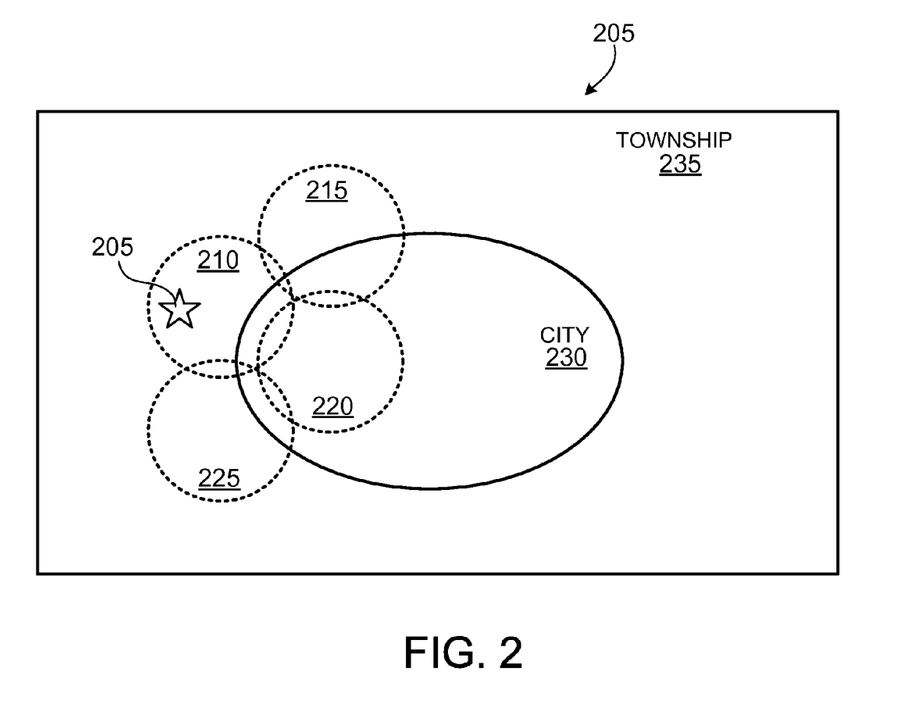
FIG. 2 is an example of a map showing a location of a communication device.

FIG. 2 is an example of map 200 illustrating how the connection between the communication device and its location at the time of the utterance can be used to limit the universe of potential speakers. As shown, the map 200 includes a Township 235, which includes a City 230 and multiple cell regions, four of which are shown: 210, 215, 220 and 225. In general, the geographic locations and extents of cell regions are static and publicly known. In this example, assume the speaker, and thus the communication device used by the speaker, is at location 205, which happens to fall within cell region 210, the corresponding location and extent (e.g., latitude and longitude of centerpoint plus radius) of which is known to and/or discernible by the server. Accordingly, because most people tend to spend the large majority of time at or near their respective homes and/or works, a reasonable inference is that the speaker was at or near his home or work when he made the received utterance. Using that inference, the location information (that is, the geographic location of cell region 210) is communicated to the server which then uses it to limit the universe of potential speakers' voice signatures against which the received utterance is compared in an attempt to identify the speaker. More specifically, the server first compares the received utterance against voice signatures of users that have registered an address (e.g., a home or work address) with the service provider that is within cell region 210. If no match is found based on a comparison against those users, the server then compares the received utterance against voice signatures of users that have registered an address within one of the neighboring cell regions 215, 220 or 225. Still if no match is found, the server can further expand the search to include all registered users in the city 230, the township 235, and so on. Assuming a match is made between the received utterance and a voice signature in the server's repository corresponding to a specific individual, the server can then provide the speaker/communication device with access to the identified speaker's personal information and/or services or resources that are personalized or otherwise customized for that individual. The information and/or resources made available in this manner can reside either server-side (i.e., cloud-based) or locally on the device itself or a combination of both.

Although the example of FIG. 2 uses cell regions as a basis for determining a location of the speaker/communication device, essentially any other appropriate and available location-based information could be used instead or in addition. For example, if the communication device has GPS (Global Positioning Satellite) information available, then the communication device's GPS location could be transmitted to the server and used for the iterative, location-constrained voice signature matching described above. Alternatively, or in addition, if the communication device is communicating via a WiFi connection (or otherwise using IP (Internet Protocol)), then various techniques could be used to identify the communication device's location in a similar manner. Moreover, the device location used to limit the universe of potential speakers need not be limited to the location of the device at the time the utterance under consideration was received by the device. Alternatively, or in addition, a former or more recent location of the device (i.e., either before or after the utterance) could be used as the limiting factor. Similarly, more than a single location could be used, e.g., by aggregating multiple device positions over a recent period of time (e.g., minute, hour, day, week, etc.) and using an average location or a range of locations in which the device tended to reside most often during that period of time, e.g., a typical location or range of locations for the communication device as determined from historical usage patterns.

Social connections of the communication device's owner are another type of connection that could be used—alone or in combination with other connections—to limit the universe of voice signatures against which the received utterance is compared to identify the utterance's speaker. Such social connections can be inferred from any of a number of various information sources associated with the communication device's owner (e.g., electronic contact lists, email address lists, email messages sent/received, social network interactions, telephone calls made/received, etc.) and can be inferred based on either explicit or implicit information, or both. As an example, assume that the server receives an utterance from a communication device and further that the server does not know, or has a low confidence level about, the identity of the utterance's speaker, and thus needs first to conclusively identify the speaker before proceeding to process the command or other request embodied in the utterance. To do so, the server identifies a comparison group—that is, a limited group of known speakers (e.g., registered users for whom voice signatures are available) against which to compare the voice embodied in the received utterance for a potential voice recognition match. Assume further that the server knows the identity of the owner of the communication device (e.g., either based on an IMEI received from the device or because the device is logged in). In this example, the server starts with a group of known speakers that have social connections with the communication device's owner, namely, all registered users who appear in the device owner's online contact list and/or all registered users who are known to have used the communication device in the past. The reasonable inference relied on here is that, since the speaker is not the device owner, likely the speaker is someone that the device owner knows well enough to let use his communication device. Based on that level of inferred familiarity between the speaker and the device's owner, there is a reasonable chance that the speaker's name will appear in the device owner's contact list and/or lists of people with whom the communication device owner previously communicated via telephone and/or email. Consequently, a reasonable place for the server to start looking for matches to the speaker's voice is within the device owner's online contact list and within the device owner's history of calls and/or email messages made and/or received, all of which by definition include individuals with which the device owner has at least a threshold level of familiarity.

Figure 3:
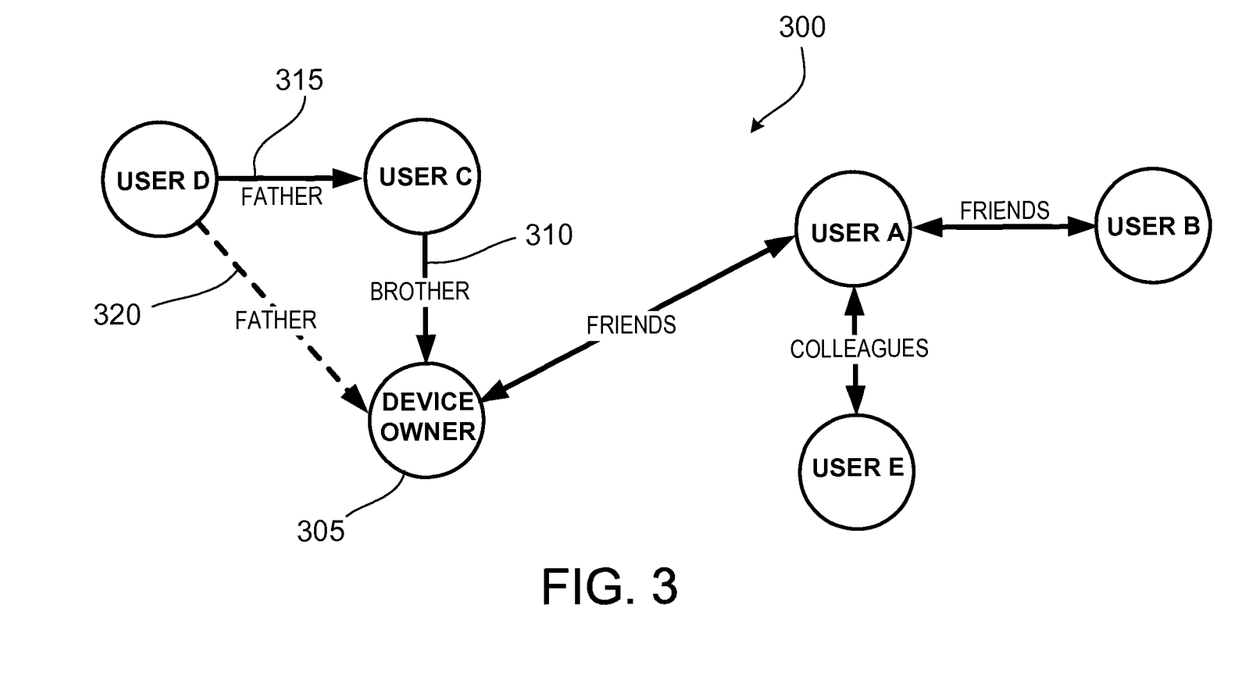
FIG. 3 is a portion of an example social graph.

FIG. 3 shows a portion of an example social graph 300 in which connections—either explicit or implicit or both—among the device owner and other individuals can be discerned and used to draw inferences as reasonable groupings of known speakers against which to compare the utterance speaker's voice. As shown, the Device Owner 305 is determined (e.g., through social network interactions and/or declared statuses) to be "friends" with user A, who in turn is "friends" with user B and "colleagues" with user G. Accordingly, upon uncovering these explicit social connections (which can be performed in a pre-processing manner or in real time, or a combination thereof), the server could determine to include users A and B (who are either first order or second order friends of the Device Owner) in the limited group of users (assuming that they're registered users having voice signatures on file) against which to compare the speaker's voice for a match. Along those same lines, the server could determine not to include user E in the limited group of known speakers under the logic that a colleague of a friend of the Device Owner is too attenuated of a social connection to likely be fruitful in searching for a match between the utterance's speaker and an individually likely to be using Device Owner's communication device.

FIG. 3 also shows an example of implicit social connections that can be inferred from a social network to which Device Owner belongs. In this example, assume that two connections—namely, the familial relationships of brother 310 and father 315—have been made explicit, thereby providing the explicit knowledge that user C is the brother of Device Owner and that user D is the father of user C. Based on this explicit knowledge, an implicit social connection (father 320, shown as a dotted line) can be inferred, thereby providing the implicit knowledge that user D also is the father of Device Owner. Consequently, the server can use the inferred, implicit social connection 320 to include user D in the limited group of users against which to compare the speaker's voice for a potential match in an effort to identify the speaker.

Although the example social graph shown in FIG. 3 depicts only a single level of indirection (with regard to Device Owner and users C and D), implicit social connections may be inferred using two or more levels of indirection depending on the available explicit connections and the nature of the implicit connections to be inferred. In addition, implicit connections other than or in addition to familial relationships can be inferred and used to identify limited groups of users against which to compare the speaker's voice for a potential match.

Figure 4:
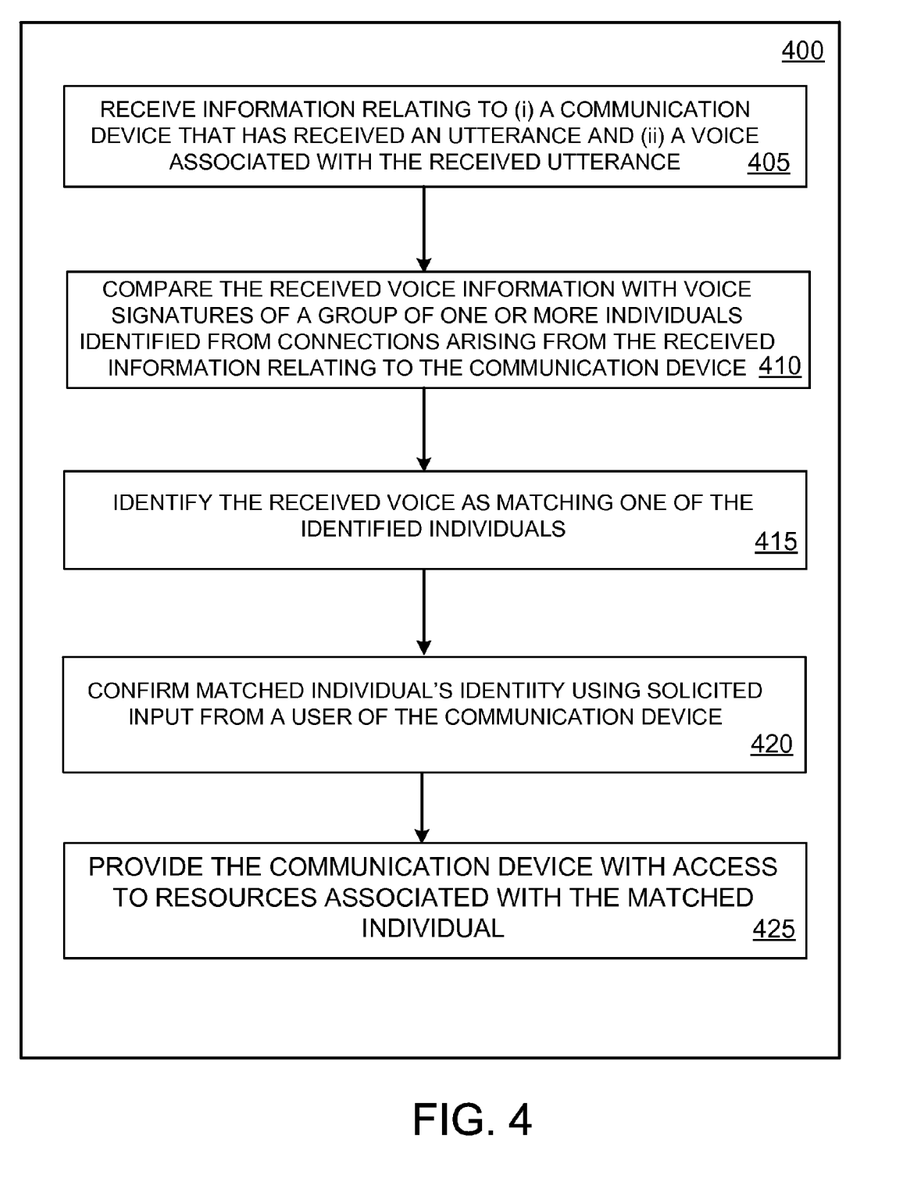
FIG. 4 is a flowchart showing an example of a process for providing a communication device with access to resources associated with an identified individual.

FIG. 4 is a flowchart of an example process 400 for providing a communication device with access to resources associated with an identified individual. The process 400 may be performed, for example, in whole or in part by the server 125 in FIG. 1. First, at 405, the process 400 receives information relating to (i) a communication device that has received an utterance (e.g., a command such as "call Joe Smith" spoken by a user of the communication device) and (ii) a voice associated with the received utterance. The received information relating to the communication device may include, e.g., a unique device identifier such as the device's IMEI or ESN and/or information about a persistent login state of the device, that is, whether or not the communication device is logged into the server and, if so, which account is the device logged into. Alternatively, or in addition, the received information relating to the communication device may include information about the location of the communication device (e.g., based on GPS information, IP address and/or cell region) at the time the utterance was received. The received information about the voice associated with the received utterance may include, e.g., a digital description of the received voice, which can subsequently be compared against voice signatures of known speakers in an effort to perform speaker recognition.

Next, at 410, the process 400 compares the received voice information with voice signatures of a group of one or more individuals identified from connections arising from the received information relating to the communication device. The connections arising from the received information relating to the communication device may include, among others, location proximity connections and/or social connections. For example, with regard to location proximity connections, when the server has information identifying the location of the communication device, individuals associated with an address determined to be located (e.g., the individuals in question have a registered address with the service provider) within a threshold proximity (e.g., within a certain number of miles, within the same cell region, within the same city/township/etc.) may be included in the comparison group. As an example of social connections, when the server has information identifying the owner of the communication device (e.g., based on the device's unique identifier and/or the device's persistent login state), individuals determined to have a sufficient and/or appropriate social connection to the device's owner may be included in the comparison group. Identification of the comparison group's individuals (i.e., those against whose voice signatures the received utterance will be compared) may be performed in a pre-processing manner (i.e., prior to 405) and/or in a dynamic, real time manner (i.e., subsequent to 405).

Next, at 415, based on a result of the comparison in 410, the process 400 determines that the voice associated with the utterance matches one of the identified individuals in the comparison group. Optionally, at 420, to help prevent a masquerader from pretending to be another user (e.g., by mimicking his voice), the process 400 may further confirm the matched individual's identity using solicited input from a user of the communication device. For example, at 420 the process 400 may cause the server 125 to communicate with the communication device 110 and query the speaker 105 with a challenge-response question, the answer to which likely would be known only to the matched individual (e.g., "what is your mother's birth date?"). If the speaker 105 then provided an incorrect response, the process 400 could deny access to the matched individual's account.

Lastly, because the process 400 has identified the voice associated with the utterance as matching one of the identified individuals in 415, the process 400 then at 425 provides the communication device (and thus the user of the communication device) with access to resources associated with the matched individual. Examples of such resources may include personal information and/or personalized, cloud-based services.

The techniques described here may, in appropriate circumstances, permit a user to generalize or otherwise anonymize personal information that is provided to a central computer service. For example, where appropriate, a user may be provided with an option to opt in or opt out of services such as those described herein that may need to obtain particular information in order to work properly. Also, a user's location or other information may be generalized, such as by reporting or saving the user according to a relatively large geographic metric such as a zip code. Moreover, a service may limit the ways in which such information can be used or shared, and the length of time that the information will be stored. Such factors may be made known to a user who, in appropriate situations, may choose to provide more or less information while recognizing that the level of service they are provided may be reduced as the level of obtained information is decreased.

Figure 5:
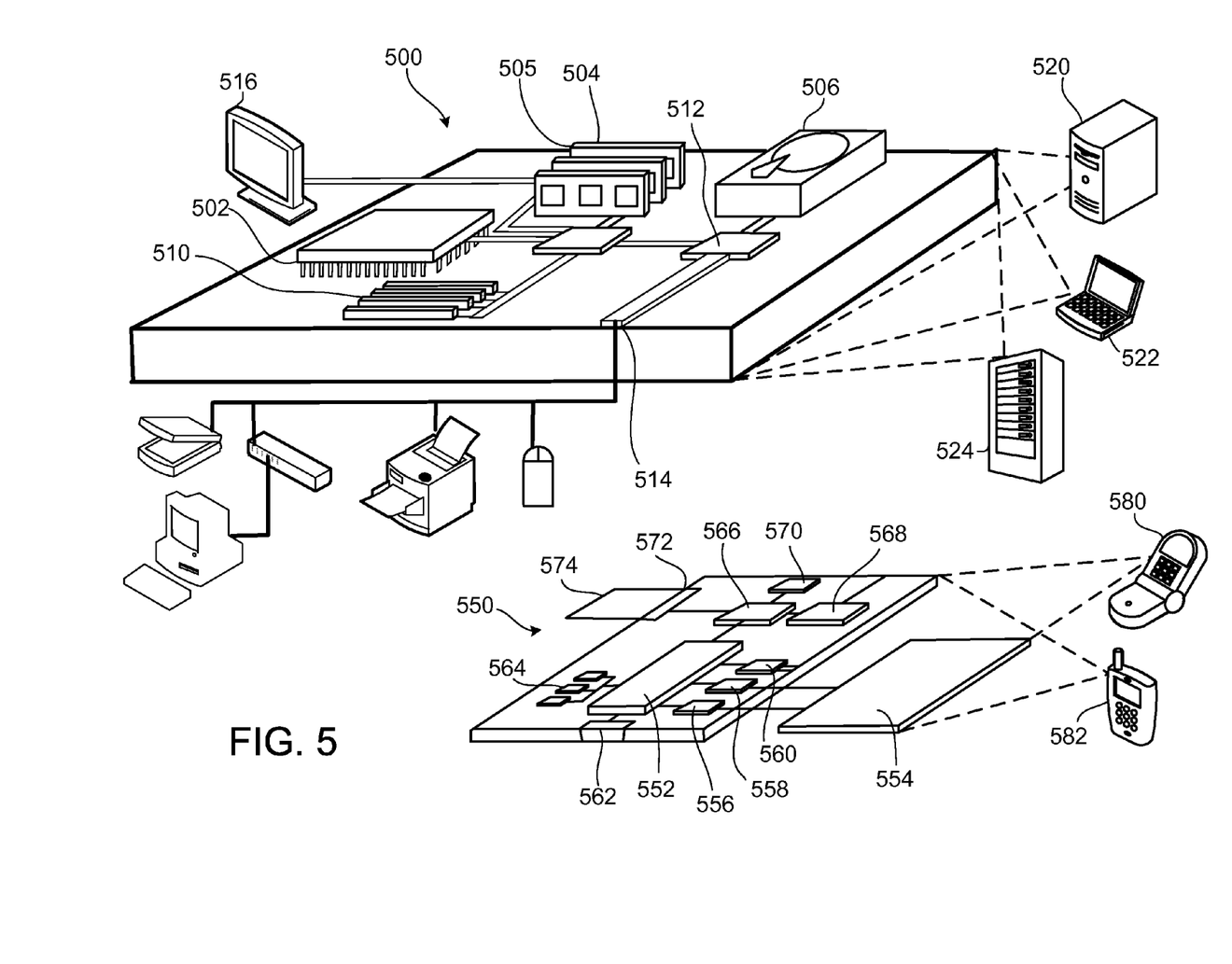
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552,

564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
   receiving information relating to (i) a communication device that has received an utterance and (ii) a voice associated with the received utterance, the received information relating to the communication device including a geographic location of the communication device;
   comparing the received voice information with a plurality of voice signatures in a comparison group, the comparison group corresponding to a plurality of different individuals location of the communication device, wherein the comparison group includes at least one voice signature for each different identified individual;
   attempting to identify the voice associated with the utterance as matching the voice signature corresponding to one of the individuals in the comparison group;
   if the attempt to identify the voice associated with the utterance is unsuccessful, iteratively repeating the attempting to identify the voice associated with the utterance using a modified comparison group, the modified comparison group corresponding to a different geographic region than was used in a previous attempt to identify the voice associated with the utterance, the iterative repeating of the attempting to identify the voice associated with the utterance continuing until the voice associated with the utterance is successfully identified; and
   providing the communication device with access to one or more resources associated with the individual whose voice signature matched the voice associated with the utterance.

2. The method of claim 1 wherein the information relating to the communication device comprises an identity of an owner of the communication device.

3. The method of claim 2 wherein the identity of the communication device's owner is determined based on one or more of (a) a unique identifier associated with the communication device and (b) a persistent login state of the communication device.

4. The method of claim 2 further comprising:
   analyzing a body of information associated with the communication device's owner to identify individuals having a social connection with the communication device's owner, and
   adding the identified individuals to the comparison group.

5. The method of claim 1 wherein the location of the communication device is determined based on one or more of a cell region, a GPS location, and an Internet Protocol (IP) address.

6. The method of claim 1 further comprising:
   analyzing information associated with the communication device's location to identify individuals having an associated threshold proximity to the communication device, and
   adding the identified individuals to the comparison group.

7. The method of claim 1 wherein providing the communication device with access to one or more resources comprises providing the communication device with access to at least one of personal information and personalized services.

8. The method of claim 1, subsequent to identifying and prior to providing, confirming the matched individual's identity using solicited input from a user of the communication device.

9. The method of claim 1 wherein the geographic region encompassing the geographic location of the communication device comprises at least one of a cell region, a city, or a township.

10. The method of claim 1 wherein the different geographic region is adjacent to the geographic region encompassing the geographic location of the communication device.

11. The method of claim 1 wherein the different geographic region encompasses the geographic region encompassing the geographic location of the communication device.

12. The method of claim 1 wherein the different geographic region at least partially overlaps the geographic region encompassing the geographic location of the communication device.

13. A system comprising:
    a processor configured to execute computer program instructions; and
    a computer storage medium encoded with computer program instructions that, when executed by the processor, cause the system to perform operations comprising:
    receiving information relating to (i) a communication device that has received an utterance and (ii) a voice associated with the received utterance, the received information relating to the communication device including a geographic location of the communication device;
    comparing the received voice information with a plurality of voice signatures in a comparison group, the comparison group corresponding to a plurality of different individuals each having an associated address within a geographic region encompassing the geographic location of the commutation device, wherein the comparison group includes at least one voice signature for each different identified individual;
    attempting to identify the voice associated with the utterance as matching the voice signature corresponding to one of the individuals in the comparison group;
    if the attempt to identify the voice associated with the utterance is unsuccessful, iteratively repeating the attempting to identify the voice associated with the utterance using a modified comparison group, the modified comparison group corresponding to a different geographic region than was used in a previous attempt to identify the voice associated with the utterance, the iterative repeating of the attempting to identify the voice associated with the utterance continuing until the voice associated with the utterance is successfully identified; and providing the communication device with access to one or more resources associated with the individual whose voice signature matched the voice associated with the utterance.

14. The system of claim 13 wherein the information relating to the communication device comprises an identity of an owner of the communication device.

15. The system of claim 14 wherein the identity of the communication device's owner is determined based on one or more of (a) a unique identifier associated with the communication device and (b) a persistent login state of the communication device.

16. The system of claim 14 further comprising:
analyzing a body of information associated with the communication device's owner to identify individuals having a social connection with the communication device's owner, and adding the identified individuals to the comparison group.

17. The system of claim 13 wherein the location of the communication device is determined based on one or more of a cell region, a GPS location, and an Internet Protocol (IP) address.

18. The system of claim 13 further comprising:
analyzing information associated with the communication device's location to identify individuals having an associated threshold proximity to the communication device, and adding the identified individuals to the comparison group.

19. The system of claim 13 wherein providing the communication device with access to one or more resources comprises providing the communication device with access to at least one of personal information and personalized services.

20. The system of claim 13, subsequent to identifying and prior to providing, confirming the matched individual's identity using solicited input from a user of the communication device.

21. The system of claim 13 wherein the geographic region encompassing the geographic location of the communication device comprises at least one of a cell region, a city, or a township.

22. A non-transitory computer storage medium encoded with a computer program, the program comprising instructions that when executed by data processing apparatus cause the data processing apparatus to perform operations comprising:

receiving information relating to (i) a communication device that has received an utterance and (ii) a voice associated with the received utterance, the received information relating to the communication device including a geographic location of the communication device;

comparing the received voice information with a plurality of voice signatures in a comparison group, the comparison group corresponding to a plurality of different individuals each having an associated address within a geographic region encompassing the geographic location of the communication device, wherein the comparison group includes at least one voice signature for each different identified individual;

attempting to identify the voice associated with the utterance as matching the voice signature corresponding to one of the individuals in the comparison group;

if the attempt to identify the voice associated with the utterance is unsuccessful, iteratively repeating the attempting to identity the voice associated with the utterance using a modified comparison group, the modified comparison group corresponding to a different geographic region than was used in a previous attempt to identify the voice associated with the utterance, the iterative repeating of the attempting to identify the voice associated with the utterance continuing until the voice associated with the utterance is successfully identified; and providing the communication device with access to one or more resources associated with the individual whose voice signature matched the voice associated with the utterance.

23. The non-transitory medium of claim 22 wherein the information relating to the communication device comprises an identity of an owner of the communication device.

24. The non-transitory medium of claim 23 wherein the identity of the communication device's owner is determined based on one or more of (a) a unique identifier associated with the communication device and (b) a persistent login state of the communication device.

25. The non-transitory medium of claim 23 further comprising:
analyzing a body of information associated with the communication device's owner to identify individuals having a social connection with the communication device's owner, and adding the identified individuals to the comparison group.

26. The non-transitory medium of claim 22 wherein the location of the communication device is determined based on one or more of a cell region, a GPS location, and an Internet Protocol (IP) address.

27. The non-transitory medium of claim 22 further comprising:
analyzing information associated with the communication device's location to identify individuals having an associated threshold proximity to the communication device, and adding the identified individuals to the comparison group.

28. The non-transitory medium of claim 22 wherein providing the communication device with access to one or more resources comprises providing the communication device with access to at least one of personal information and personalized services.

29. The non-transitory medium of claim 22, subsequent to identifying and prior to providing, confirming the matched individual's identity using solicited input from a user of the communication device.

* * * * *

UNITED STATES PATENT AND TRADEMARK OFFICE
CERTIFICATE OF CORRECTION

PATENT NO.         : 8,571,865 B1
APPLICATION NO.    : 13/572364
DATED              : October 29, 2013
INVENTOR(S)        : Philip Hewinson Page 1 of 1

It is certified that error appears in the above-identified patent and that said Letters Patent is hereby corrected as shown below:

In the Claims

Column 11, lines 38-39, Claim 1, please delete "individuals" and insert therefor -- individuals each having an associated address within a geographic region encompassing the geographic --; and Column 12, line 56, Claim 13, please delete "commutation" and insert therefor -- communication --.

Signed and Sealed this
Fourth Day of March, 2014

Michelle K. Lee
*Deputy Director of the United States Patent and Trademark Office*